June 21, 1960     E. C. SCANLON     2,941,440
BRAIDER MACHINE PLASTIC HORN GEAR
Filed June 10, 1959
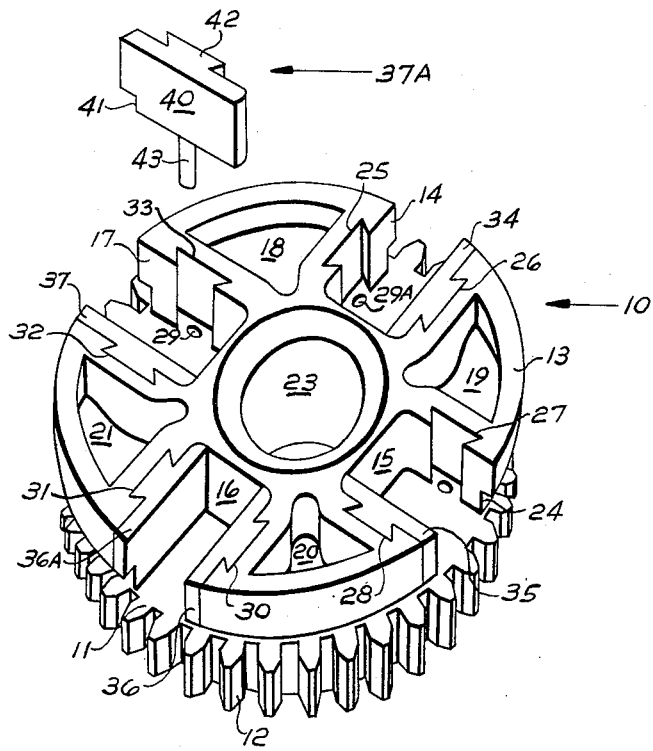
FIG. I
INVENTOR.
EDWARD C. SCANLON
BY
William Frederick Werner
ATTORNEY

2,941,440
BRAIDER MACHINE PLASTIC HORN GEAR

Edward C. Scanlon, 13 Richmond Ave.,
West Barrington, R.I.

Filed June 10, 1959, Ser. No. 819,316

2 Claims. (Cl. 87—50)

The present invention relates to plastic gears and more particularly to braider machine plastic horn gears provided with replaceable wear surfaces.

In a braiding machine there is provided a plurality of concentric circles of horn gears, with each gear in the outer circle intermeshing with a gear in the inner circle or with a gear in an intermediate circle which meshes with a gear in the inner circle. Two series of spindle or bobbin carrier units travel in two defined continuous tracks created by the horn gears. The tracks following approximately the pitch lines of the gears and crossing each other at each point where the gears intermesh. This type of machine produces a tubular braid.

In the past these machines were extremely noisy due to the rotation of so many metal gears. In addition there was great wear on the gear teeth. The increased wear on the gear teeth increased the noise factor. If a gear was replaced, it meshed with partly worn gears. The bobbin thread carrier fabricated of metal was literally thrown from one horn gear to another. This caused noise and wear. The seats of the horn gear wear out more rapidly than the gear teeth. This requires a replacement of the whole gear. The metal carrier would therefore follow a path created by the seats in the horn gears which were at times worn, partly worn and sometimes had new seats. This was an undesirable mechanical condition and a noisy one.

The present invention overcomes these undesirable conditions by providing a horn gear fabricated from plastic. The horn gear having means to provide replaceable wear surfaces for carrier engagement. In addition the gears, the inserts or both may be fabricated from different colored plastic material to identify the position of the gear in the gear chain and to identify the time period when the replaceable inserts were replaced. Thus a check on wear can now be made in a mill. In addition as a gear wears into use it can be repaired and replaced in the same spot, thereby, reducing the noise factor by providing proper meshing. The plastic gears are much more quiet in operation in comparison to metal gears.

Other objects of the present invention will be pointed out in part and become apparent in part in the following specification and claims.

Referring to the drawings in which similar characters of reference refer to like parts:

Figure 1 is a perspective view of the new and improved braider plastic horn gear.

In proceeding with this invention, the horn gear, generally indicated by reference character 10, is molded preferably of nylon plastic in any chosen color. The horn gear 10 consists of a lower body member 11 provided with spur gear teeth 12 in the outer periphery. A circular pad or superstructure 13 is integrally molded to lower body member 11. The circular pad 13 is provided with four U shaped tracks or guide ways 14, 15, 16, 17 and four recessed areas 18, 19, 20, 21 which reduce the amount of material necessary to fabricate the horn gear 10 and thereby lessens the weight of the horn gear 10. An axial bearing 23 is provided in lower body member 11 and in circular pad or superstructure 13.

Circular pad 13 is provided with a cut back 24 to provide clearance necessary in the operation of a horn gear 10.

Each U shaped track or guide way is provided with two female dove tail grooves located in the opposite parallel walls thereof. For example guide way 14 is provided with female dove tail grooves 25, 26. Guide way 15 has female dove tail grooves 27, 28. Guide way 16 has female dove tail grooves 30, 31 and guide way 17 is provided with female dove tail grooves 32, 33. Dowel pin orifices 29, 29A etc., are provided in lower body member 11 at the base of the female dove tail grooves 33, 25 etc.

Two removable inserts are provided for the two female dove tail grooves in each guide way. Guide way 14 is illustrated with removable insert 34 mated in female dove tail groove 26. Guide way 15 is shown with removable insert 35 mated in female dove tail groove 28. Guide way 16 hows both removable inserts 36, 36A located in female dove tail grooves 30, 31, respectively. And guide way 17 illustrates removable insert 37 mated in female dove tail groove 32. Removable insert generally indicated as 37A is illustrated in a position immediately above female dove tail groove 33. Each removable insert consists of rectangular body member 40 provided in the lower outer edge with a cut back 41 and a male dove tail tongue 42 located in the back thereof. A dowel pin 43 is fixed to and projects from the bottom of body member 40. Each removable insert is fabricated of nylon plastic in any selected color.

The dowel pin 43, for example, will be driven into orifice 29 with male dove tail tongue 42 mated with female dove tail groove 33. When it is desired to remove removable insert 37A from female dove tail groove 33, a plug or other similar tool will be placed on the end of dowel pin 43 and struck with a hammer to remove dowel pin 43 from orifice 29 and male dove tail tongue 42 from female dove tail groove 33.

Guide way 14 is located at an angle of ninety degrees from both guide ways 15 and 17. Guide way 14 is located at an angle of one hundred eighty degrees from guide way 16 in the manner usual to the operation of braider machine horn gears.

Having shown and described a preferred embodiment of the present invention, by way of example, it should be realized that structural changes could be made and other examples given without departing from either the spirit or scope of this invention.

What I claim is:

1. A braider machine horn gear formed of nylon material and consisting of a lower body member provided with gear teeth in the outer periphery thereof, a circular pad integrally formed in said lower body member provided with a circular cut back adjacent said gear teeth, four U shaped carrier bobbin tracks having opposite parallel walls formed in said circular pad, each track located at an angle of ninety degrees from the adjacent track, an axial bearing in both said lower body member and in said circular pad, a removable insert formed of nylon material in pre-selected color, one for each of the opposite parallel walls of each of the four U shaped carrier bobbin tracks, and means to removably secure the removable insert in position in the opposite parallel wall of each of said tracks to provide replaceable and identifiable wear surfaces in the carrier bobbin tracks.

2. A braider machine horn gear formed of a relatively hard plastic material such as nylon in a pre-selected color and consisting of a lower body member provided with gear teeth in the outer periphery thereof, a circular pad integrally formed in said lower body member and provided with a circular cut back adjacent said gear teeth, four U shaped guide ways formed in said circular pad, four recessed areas formed in said circular pad, one recessed area between adjacent U shaped guide ways, an axial bearing in both said lower body member and in said circular pad, two female dove tail grooves located in the opposite walls of each of said four U shaped guide ways, a dowel pin orifice in the lower body member at the base of each female dove tail groove, and a removable insert, one for each female dove tail groove, formed of relatively hard plastic material such as nylon in a preselected color and consisting of a rectangular body member provided at the lower outer edge with a cut back aligned with the cut back in said circular pad, a male dove tail tongue formed in the back of said rectangular body member, a dowel pin projecting from the bottom of said rectangular body member and engageable and disengageable with a dowel pin orifice, said male dove tail tongue mating with a female dove tail groove to provide a removable and identifiable insert in a hard plastic braider machine horn gear distinguishable by color from other braider machine horn gears.

References Cited in the file of this patent

UNITED STATES PATENTS 873,698   Janssen _____ Dec. 10, 1907

FOREIGN PATENTS 551,011   France _____ Dec. 23, 1922